TELEPROGRAMME ON AUTOMATIC TELEPHONE CIRCUITS

Filed July 23, 1947 5 Sheets-Sheet 1

INVENTOR
CLEMENT M. THEILLAUMAS
BY Robert Harding
ATTORNEY

TELEPROGRAMME ON AUTOMATIC TELEPHONE CIRCUITS

Filed July 23, 1947 5 Sheets-Sheet 2

INVENTOR
CLEMENT M. THEILLAUMAS
BY Robert Harding Jr.
ATTORNEY

April 24, 1951 C. M. THEILLAUMAS 2,549,861

TELEPROGRAMME ON AUTOMATIC TELEPHONE CIRCUITS

Filed July 23, 1947 5 Sheets-Sheet 3

INVENTOR
CLEMENT M. THEILLAUMAS
BY Robert Harding Jr.
ATTORNEY

TELEPROGRAMME ON AUTOMATIC TELEPHONE CIRCUITS

Filed July 23, 1947 5 Sheets-Sheet 4

INVENTOR
CLEMENT M. THEILLAUMAS
BY Robert Harding Jr.
ATTORNEY

TELEPROGRAMME ON AUTOMATIC TELEPHONE CIRCUITS

Filed July 23, 1947 5 Sheets-Sheet 5

INVENTOR
CLEMENT M. THEILLAUMAS
BY Robert Harding Jr.
ATTORNEY

Patented Apr. 24, 1951

2,549,861

UNITED STATES PATENT OFFICE 2,549,861

TELEPROGRAMME ON AUTOMATIC TELEPHONE CIRCUITS

Clement Marie Theillaumas, Boulogne-Billancourt, France, assignor to International Standard Electric Corporation, New York, N. Y., a corporation of Delaware Application July 23, 1947, Serial No. 763,108
In France February 7, 1939

Section 1, Public Law 690, August 8, 1946
Patent expires February 7, 1959

8 Claims. (Cl. 179—2.5)

Figure 1:
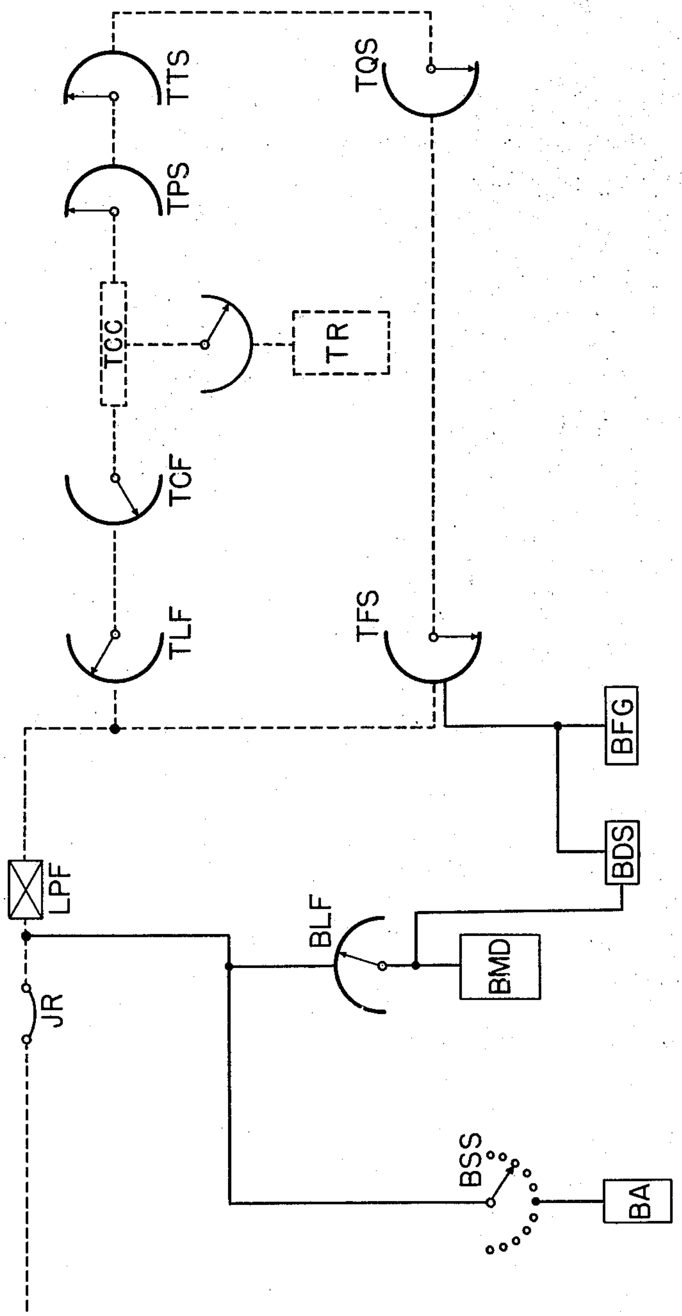

The present invention relates to systems of transmission of signals on automatic telephone networks and the like, and in particular automatic telephone systems in which messages or information transmitted to the subscribers of a network are conducted by the same wires or paths as the normal communication between the subscribers of this network, or between different networks.

The invention in particular has as one of its objects the provision of telephone systems in which the transmission of broadcast messages or programs over wires is carried out by the same paths as the individual communications to the subscribers, without the reception of this broadcast information or programs interfering at the subscriber's station with the ordinary use of his telephone communication system.

It is also an object of the invention to provide telephone systems adapted to permit the broadcasting of a number of important programs or information, and means at any subscriber's station of selecting these programs without interfering in practice with the ordinary use of the telephone set.

It is also the object of the invention to provide telephone systems in which programs or information may be broadcast while employing the telephone networks ordinarily in use for the usual telephone systems, and of which the installation and maintenance are moderate in cost.

In accordance with one of the characteristics of the invention, the programs and information are routed at the subscriber's set of a telephone system by means of a supersonic frequency current.

In accordance with another characteristic of the invention means are provided at the subscriber's station in order that the latter may control the switching means enabling him to receive a program broadcast on his network.

In accordance with another characteristic of the invention, means are provided at the subscriber's station to amplify a program received on his telephone line, either by sets of special amplifiers, or by ordinary commercial pick-up amplifier systems.

In accordance with another characteristic of the invention, means are provided at the receiving end to separate the telephone currents of normal frequencies, and the supersonic frequency currents employed to broadcast programs over telephone lines.

In accordance with another characteristic of the invention, means are provided at the central exchange to adapt the ordinary equipment of a central exchange to the broadcasting of a program at the same time as its ordinary operation for communication between subscribers, and between the subscribers and the exchange.

In accordance with another characteristic of the invention, means are provided, if desired, to prevent the operation of the ordinary metering elements for communication when a subscriber asks for a broadcast program.

In accordance with another characteristic of the invention, the various operations of discovering the calling line, discriminating the desired program, and setting of the step-by-step switch which selects the programs, are entrusted to a control circuit which is released when the last of these operations is finished.

Generally speaking, telephone broadcasting systems incorporating the characteristics of the invention employ the existing subscribers' telephone lines, but leave to the subscribers the disposal of their line for the normal and practically permanent use of the telephone. The programs to be broadcast are routed at the subscriber's station by means of a current of supersonic frequency, for example, of a frequency of the order of 20,000 cycles per second. A considerable number of programs is at the disposal of a subscriber who can operate on his set means for controlling the switching which give him the program he chooses. The amplification at the subscriber's station is effected either by means of a specially arranged set, or by the low frequency portion of an ordinary radio broadcasting receiving set by the use of the "pick-up" connection preceded by a single demodulating cell.

If it is desired to employ a subscriber's station installed in the usual way, a four-pin plug is introduced after withdrawing the fuses in the protector and fuse socket of the telephone station proper. The four wires of this connection are extended through a line termination filter which insures the separation of the modulated current of the program from the voice frequency current. This filter, if desired, may be placed in a casing also containing the fuses and the demodulator. The audio circuit of an ordinary radio broadcasting set is connected to this filter. Should the subscriber have no radio broadcasting receiving set the low frequency amplifier placed at his disposal should contain the filter and fuses. In the latter case the installation is reduced merely to the insertion of the tetrapolar plug in the fuse socket.

The individual equipment for each subscriber's station at the central exchange, particularly adapted for the program service, may comprise a line relay with two windings, equal from the impedance standpoint, which relay takes the place of the ordinary line relay, a step-by-step switch of any suitable type with 11, 22 or 25 points, two tubular condensers of the radio type, two resistances of the radio type, and a level in a finder, rotary for example, with four or five brushes.

The choice of the program is made from the subscriber's telephone set (assuming that at this moment the line is free) by operating the dial as for an ordinary call.

Each program regularly exploited is characterized by a number composed of the prefix of the exchange to which the subscriber belongs, and of a certain number of digits, for example, four. These numbers may preferably be numbers related to each other by a simple law in order to make them easy to remember. For example, for ten programs the system could be arranged in order to give them the numbers: 0000, 0111, 0222 . . . 0888 and 0999. For twenty programs the characteristic numbers may be multiples of 500, thus 0000, 0500, 1000 . . . 8500, 9000 and 9500.

The modulation may not be obtained directly. The line reached by selection is provided with special equipment which can, for example, cause all the selector circuits to advance to talking position, maintains the metering elements at rest at the time of release, applies two or more tones in series on the talking wires and causes the starting of apparatus common to a certain number of subscribers' lines.

A control circuit is provided, as indicated, in order to find the calling line, to discriminate the desired program, and to bring the step-by-step switch on to the desired program, this circuit being released when the last of these operations is finished.

Figure 2:
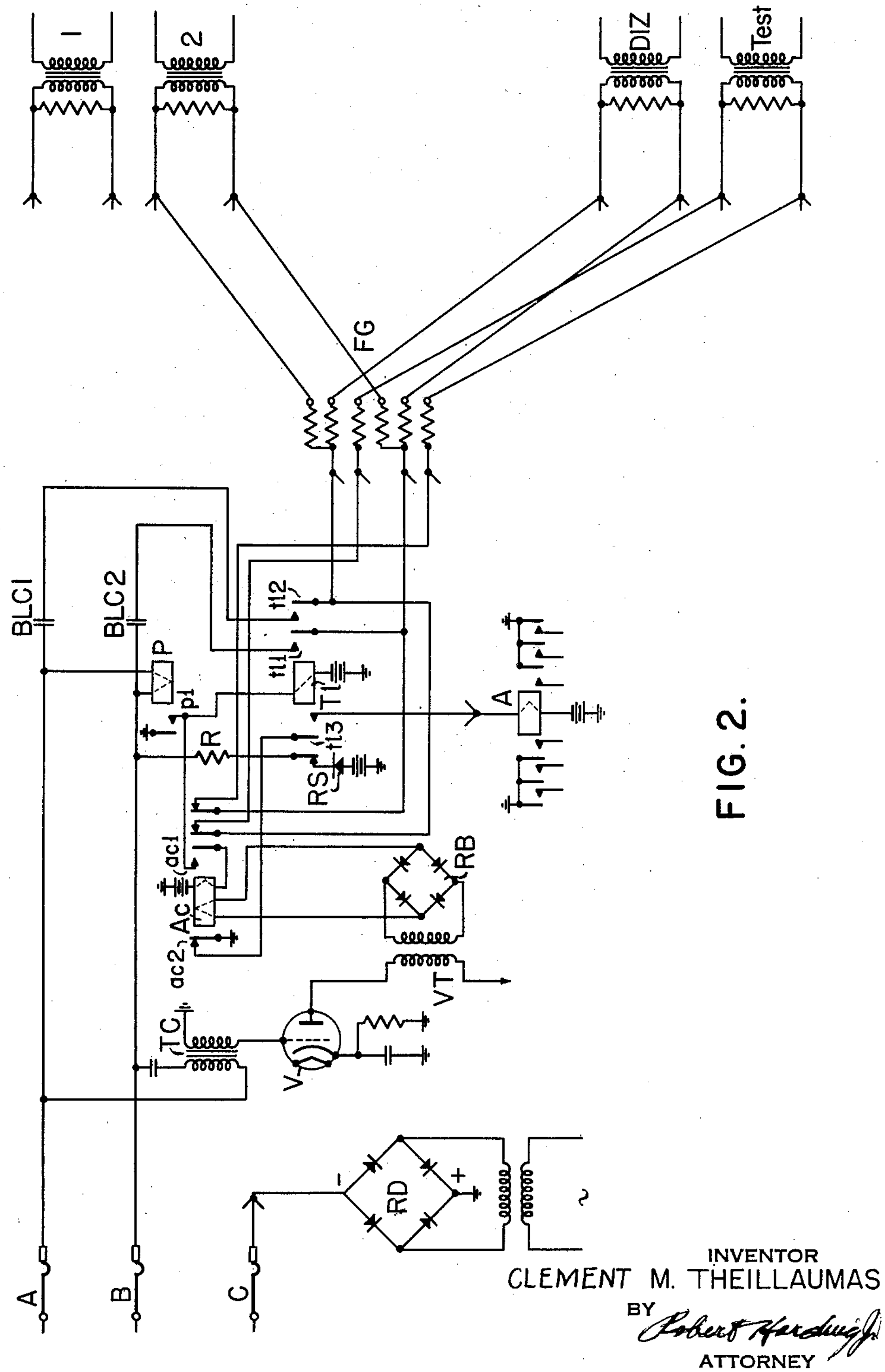
Figure 3:
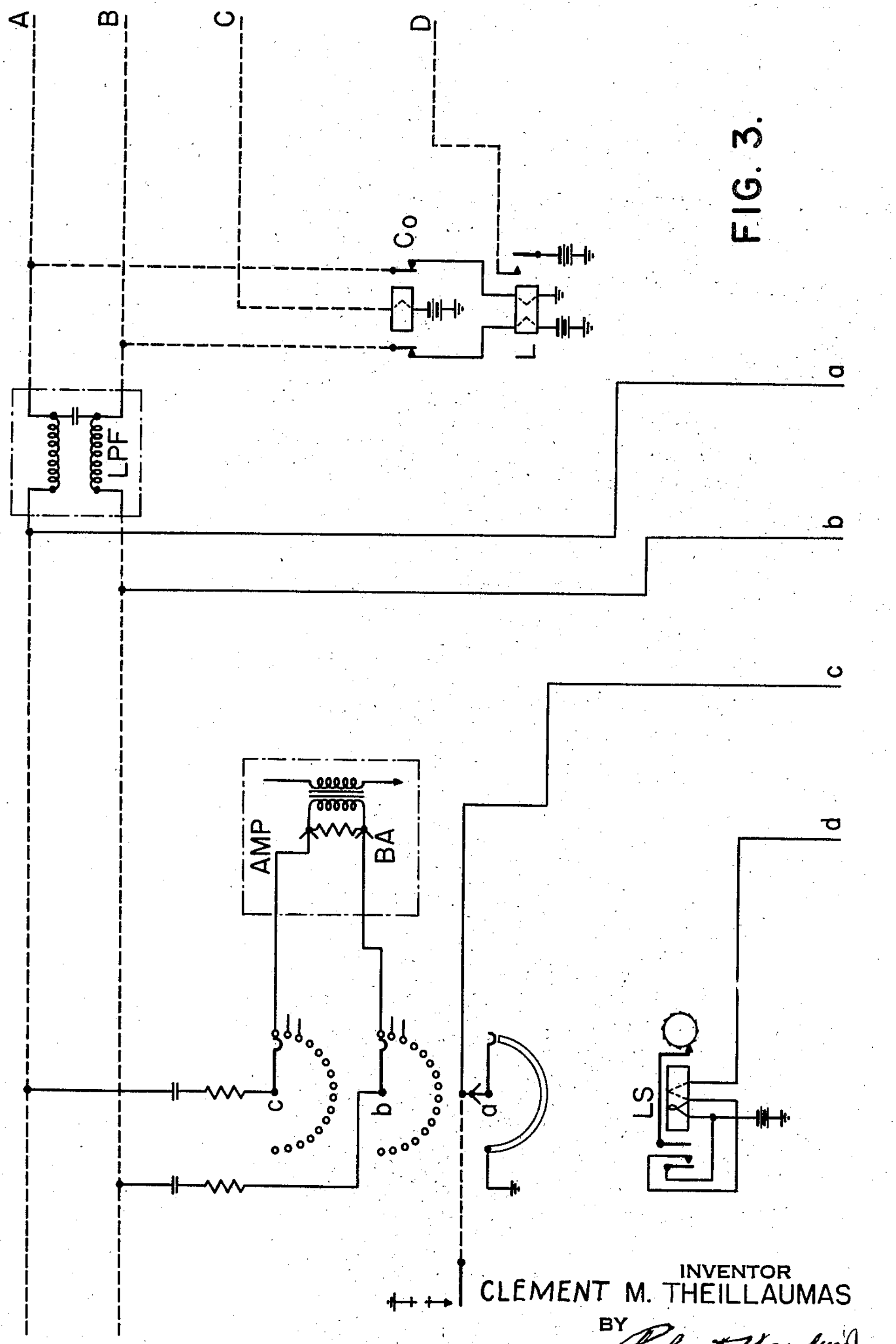
Figure 4:
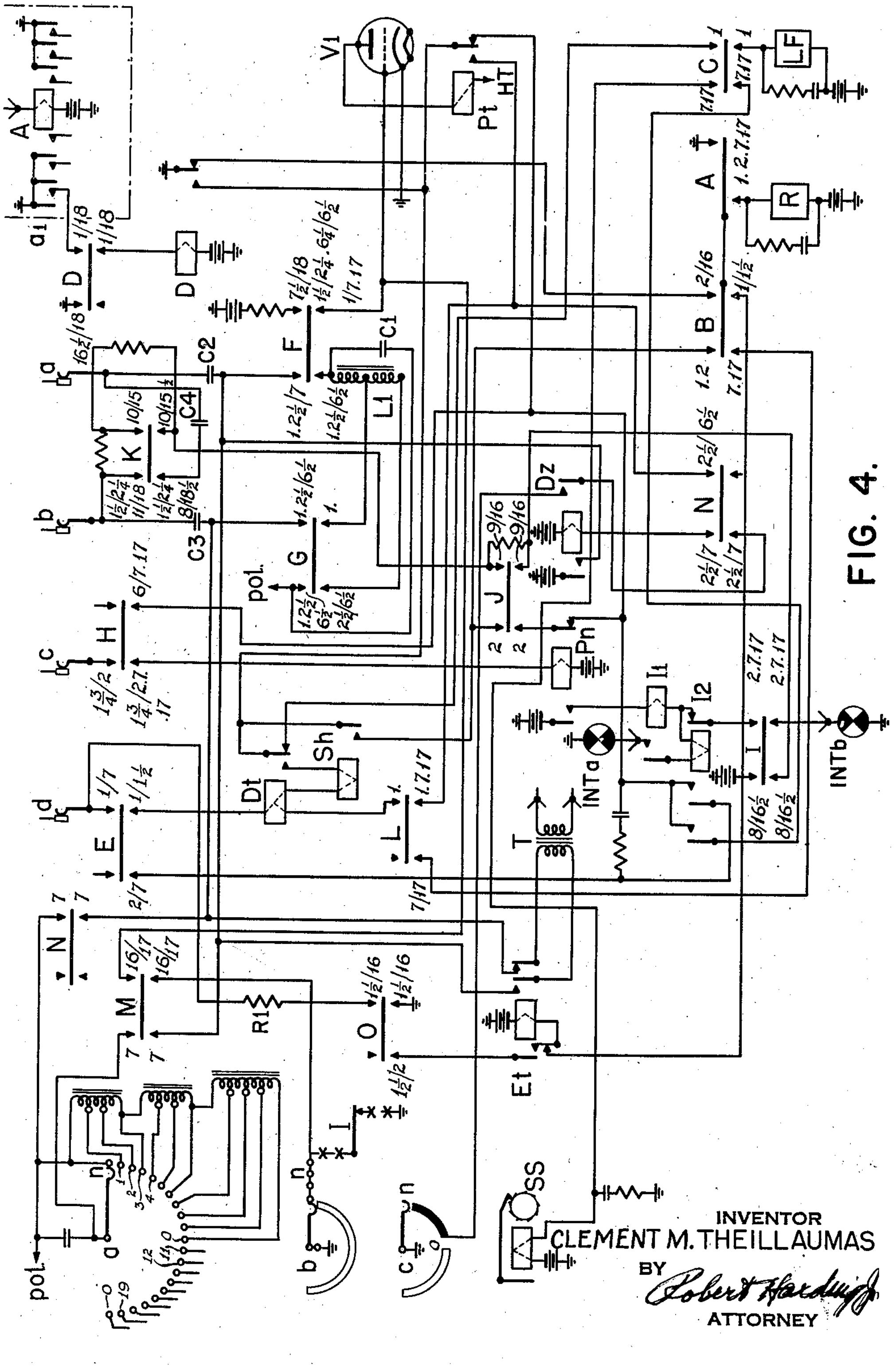
Figure 5:
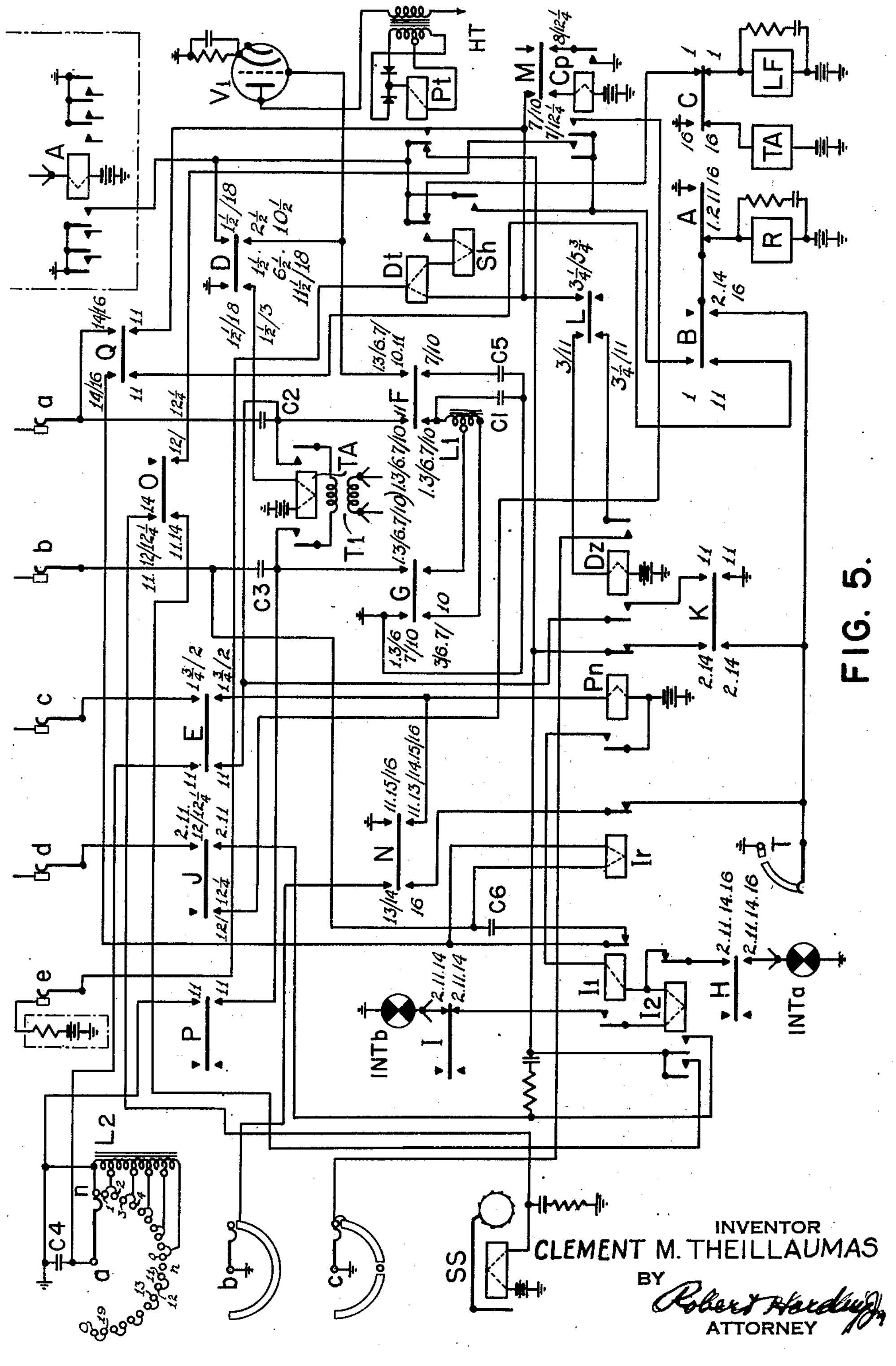

In order to explain the invention in more detail, examples of telephone systems comprising means for the transmission and reception of programs on telephone lines are given on the attached drawings, in which Fig. 1 shows schematically the junction circuit of an automatic exchange equipped for the broadcasting of programs over wires in accordance with certain characteristics of the invention;

Fig. 2 shows a characteristic program and starting line circuit for marking discriminators in accordance with certain characteristics of the invention;

Figs. 3 and 4, Fig. 4 having to be placed below Fig. 3, represent a subscriber's line circuit for the broadcasting of programs over telephone wires associated with a marking discriminator circuit in accordance with certain characteristics of the invention; and Fig. 5 shows a modification of the circuit of Fig. 4 for a different use of the program broadcasting frequencies.

In Fig. 1, to which reference will be made first of all, the normal equipment of an existing telephone circuit has been indicated in dotted lines, and the additional equipment for the broadcasting of programs has been shown in continuous lines.

As will be seen from this drawing, the invention will be described in connection with an example of a telephone network in which the normal junction circuit of an automatic exchange comprises, after the distributing frame JR, a low-pass filter LPF, a telephone line-finder TLF, a telephone call-finder TCF, leading to a cord circuit TCC of the automatic exchange, this cord circuit TCC being connected to a register circuit comprising a register finder TRF and a register TR on the one hand, and to a primary selector TPS, a tertiary selector TTS, a quarternary selector TQS and a final selector TFS connected to the telephone line-finder TLF.

The general equipment for the broadcasting of programs over wires comprises a step-by-step program-selecting switch BSS, connected to a program amplifier BA, the step-by-step switch BSS being connected to the line after the distributing frame JR; and a frequency generating circuit (12 cycles per second, for example) is employed for the broadcasting of programs BFG, connected on the one hand to the final selector TFS and on the other hand to a circuit for starting the program discriminators BDS leading to a marking discriminator BMD connected by a program-distributing line finder BLF to the circuit of the step-by-step switch BSS.

The starting of the program marking discriminators is insured by the circuit of Fig. 2 which shows a characteristic program line circuit in accordance with certain characteristics of the invention.

Each characteristic program line has a special equipment comprising the following for each selector of the group of final selectors TFS: two condensers: two condensers BLC1 and BLC2 respectively inserted in the two talking wires A and B; a high resistance relay P, for example, of 10,000 ohms, bridged on said line wires A and B in front of said condensers: a tone-connecting relay T1 of which two contacts $t11$ and $t12$ are respectively connected to the line wires A and B, and a resistance R in shunt between the line conductor B and the battery to earth through a one-way conductor unit RS, such as rectifier elements.

An individual current supply in accordance with one characteristic of the invention is provided for the wire C for all the selectors TFS of the group, so that the simultaneous tests may be possible since it is desired that the calls should be handled without delay. The problem of double test, or multiple test, does not arise, since common lines are involved and not individual lines.

The pins C of this line are connected for all the selectors TFS of the group, without passing through resistances, to a special 10 v. battery, for example, composed of a bridge RD of dry rectifiers supplied from the mains.

Any final selector TFS reaching this line immediately passes to the talking position since its test relay receives a current sufficient to cause it to operate whatever the number of selectors on the line.

The quaternary selector TQS also passes to talking position on account of the shunt to battery on wire B composed of resistance R and the battery and rectifier elements RS.

The partial rectification of the ringing current causes the ringing relay to be energized.

The tertiary selector TTS passes to talking position following the quaternary selector TQS.

The cord connecting circuit TCC advances to the waiting position of the desired subscriber.

The relay P then operates in series on the supervisory relays of the called party which themselves do not operate on account of the high resistance of P. T1 being energized applies the tones to the line from the frequency generator FG and causes the finders of the marking discriminator BMD to start.

When the subscriber hangs up his receiver, P and T1 both fall back and the circuit is available for a new call.

In accordance with another characteristic of the invention, means are provided in order that those of the finders BLF of the marking discriminators BMD which are free may be stopped when one of them has found a calling line. To this effect a tone is sent, for example, in loop, on the calling line by means of a relay which is energized as soon as the testing of said line has taken place. This tone may be of a different frequency from the program frequencies, or may consist of one of these frequencies utilized for this purpose. In the latter case it is necessary in order to avoid confusion to return said frequency of the marking discriminator to the characteristic line in accordance with the so-called "return to point" method.

When a marking discriminator BMD transmits this special tone to the line, the circuit tuned to this frequency, composed of an inductance and a capacity and bridged across the wires A and B enters in resonance, and the relay Ac is energized. This relay Ac forms a part of the unit (relay Ac, rectifier RB) inserted in the secondary of the output transformer VT of the amplifier valve V, of which the control grid circuit contains the tuned circuit TC. The relay Ac is locked by its second winding: battery, winding of Ac, work contact *ac*1, front contact of P, earth.

The supply earth of the pilot relay A which was applied through *ac*2 at normal, *t*13 in operation, is eliminated, and this relay falls back if no other call is taking place, which stops the marking discriminators controlled by the relay A.

The relay Ac with its two right-hand outside rest contacts is connected to the frequency generator (12 cycles per second, for example) FG, the test tone passing through these two connecting wires.

Figs. 3 and 4 show subscribers' line circuits with telebroadcasting and program-marking discriminator adapted to be used in relation to the circuits of Figs. 1 and 2.

In Fig. 3 where the modified circuit is shown in a continuous line, the line relay L is shown with its two balanced windings connected to the back contacts of the cut-off relay Co on the wire C.

As already mentioned, a low-pass filter LPF is inserted in the talking wires AB in order to prevent the mixture by two subscribers of programs and telephone conversation.

These circuits are adapted to be used with a marking code with twelve frequencies, for example, with the following code:

One frequency for each of the digits from 1 to 0
One frequency for the tens (odd or even)
One frequency for the test.

The arrival of a selector on a line characteristic of a program causes the energization of the relay D: battery, winding of relay D, cam DC in position 1+18 and 1+18, work contact of the relay A, earth.

The line finder LF of each discriminator circuit rotates: battery, LF, cam C, in 1 and 1, back contact of the relay D*t*, front contact of D, earth.

The passage of the brushes *a* and *b* over the pins of a calling line has the effect of energizing the relay P*t*. In effect, the test tone acts on a counter-resonant circuit constituted by an inductance with intermediate tappling L1, and a condenser C1 connected to the grid of the triode valve V1, in the plate circuit of which is the winding of the relay P*t*: brush *a*, condenser C2, cam F at 1 and 1—inductance L1, cam G in 1—on the one hand, and condenser C1, cam G at 1 and 1 on the other hand, condenser C3, brush *b*. To the grid is applied the difference of potential occurring in the counter-resonant circuit constituted by L1 and C1. The relay P*t* is energized: battery HT, winding of P*t*, space path of the triode, cathode, earth.

The relays D*t* and S*h* are both energized, the relay D*t* through the brush *d*, cam E at 1+7, and 1+1½, high resistance winding of the relay D*t*, cam L at 1 and 1, front work contact of P*t*, front contact of D*t*, earth and the relay S*h* through wiper *d*, cam E at 1+7, and 1+1½, low resistance winding of the relay D*t*, winding of S*h*, front contact of D*t*, front contact of D, earth, which locks up D*t*.

The finder LF is stopped. The control switch R passes to position 2: battery, R, cam A, cam B at 1, front contact of S*h*, front work contact of D, earth and battery, R, earth through A to 2.

From position 1 to position 2 the relays D*t* and S*h* fall back and the grid of the triode valve V1 being applied to the negative battery by a high resistance the relay P*t* also falls back. If the step-by-step switch LS of the program selector of the line is not in its normal position, the relay P*n* is energized from 1¾: battery, winding of P*n*, cam H at 1¾+2 and 1¾+2, brush and pin *c* to earth on the off-normal contact of the step-by-step switch.

The coupled relays I1 and I2 are energized, lock and fall back during the rotation of the interrupters INT*a* and INT*b* which are designed so as to insure the desired beat.

When the relay I2 is energized and locked by I1 a fresh earth is applied to the wire *d* through the circuit: earth, front contact of D, back contact of P*t*, front work contact of I2, cam E at 2+7 and 1+7, brush and pin *d*.

The program selecting step-by-step switch LS is energized and attracts its armature. When the relay I2 falls back the step-by-step LS advances on the following pin. The shunt, passing through the brush *d*, the resistance R1, the cam O at 1½+16 and 1½+16 and earth, is insufficient to maintain the armature of LS attracted. It is the object of this shunt to prevent the stoppage of other finders on the same azimuth until the end of the setting of the step-by-step switch LS on the desired program.

When the step-by-step switch arrives on its normal rest position, the relay P*n* falls back, and the control switch passes to position 7: battery, control switch R, cam A, cam B at 2, cam J at 2 and 2, back contact of P*n*, back contact of P*t*, front contact of D, earth.

During the rotation from 2½ to 6½ a circuit tuned to the characteristic frequency of the second decade, similar to the circuit L1, C1, is connected by cams F and G to the wires *a* and *b*: brush *a*, condenser C2, cam F at 2½+7 and 2½+6½, inductance and condenser of the tuned circuit in parallel, cam G at 2½+6½, condenser C3, brush *b*. Since the connections and arrangement of the second decade tuned circuit are identical with the circuit L1, C1 as shown, a separate illustration is not necessary.

The grid of the valve is brought to a high alternating potential if the characteristic frequency of the second decade is present and the relay P*t* is energized. The relay D*z* is energized: battery winding of Dz, cam N at 2½+7, and 2½+6½, front contact of Pt, front contact of D, earth. The relay Dz is locked: battery, winding of Dz, cam N at 2½ and 7, and 2½+7, front contact of Dz, mains c of the step-by-step switch SS from n to O, brush c earth.

At 7, the relay Pn is energized: battery, Pn, cam H at 7, and 6+7, back contact of Pt, back contact of D, earth.

Therefore, the relay couple I1 and I2 will again beat as in position 2. Upon each beat the step-by-step switches SS (discriminator) and LS (line) advance one pin. The step-by-step switch LS will advance through battery LS, pin and brush d, cam E at 1+7, and 2+7, front contact of 12, back contact of Pt, front contact of D, earth. The step-by-step switch SS will advance through battery, step-by-step SS, cam C at 7 and 7, front contact of 12, back contact of Pt, front contact of D, earth.

On each pin the step-by-step switch SS has a circuit tuned to one of the unit frequencies. When the circuit resonates the relay Pt is energized, stops the advance of the step-by-step switches SS and LS and causes the control switch to leave position 7.

If the relay Dz is energized and locked, the grid of the valve V1 is thereby applied to battery through brush c of switch SS during the ten first steps of SS and LS. On the pins A11, A12, A13, of the step-by-step switch SS the same anti-resonant circuits are found as on the pins A1, A2, A3 . . . .

At this moment the setting of the line step-by-step switch being finished the discriminator circuit is released and causes the selector chain to be broken in the following manner.

A battery is applied to the wire b through a resistance which is progressively eliminated in order to cause the supervisory relay of the cord circuit to be released by short circuit.

The calling subscriber, no longer hearing the characteristic tones, hangs up, and the desired program can then be heard, whatever the state of the line, normal "calling subscriber," "desired subscriber."

When the control switch R of the discriminating circuit arrives at 17, the relay Pn is energized: battery, winding of Pn, cam H at 17 and 17, back contact of Pt, front contact of D, earth.

The relay couple I1 and I2 begins to beat under the influence of the interrupters INTa and INTb and causes SS to advance: battery, SS, cam C at 17 and 17, front contact of 12, back contact of Pt, front contact of D, earth.

When the step-by-step switch SS reaches its normal position, the grid of the valve V1 is connected to earth, the polarization resistance being short circuited.

The relay Pt operates and interrupting the beat of I1 and I2 prevents any further fresh advance of the step-by-step switch SS. The control switch R passes to position 1: battery, R, cam A, cam B at 17, cam L at 17, and 17, front contact of D, earth-battery R, earth through A to 1. Having passed 18 to relay D falls back and the circuit is available to serve a fresh call.

The high capacity condenser C4 is provided so that the subscriber at the end of the selection can hear the tones greatly attenuated. This considerable reduction of level may constitute for the subscriber an indication that he must hang up.

In order that the discriminating marker finders may stop as soon as one of them has found the calling line, it is possible, as mentioned above, to send a tone in loop on the calling line by means of a relay which is energized as soon as the testing of said line has taken place. For this purpose the transformer T and the relay Et are provided in the circuit of the marker discriminator of Fig. 4.

As soon as the test has taken place this relay Et is energized through: battery, winding of Et, back contact of Et, cam B at 1:1½ and 1, front contact of Sh, front contact of D, earth.

The relay Et is locked through battery: winding of Et, front contact of Et, cam O at 1½+2, and 1½+16, earth.

A busy tone is sent in loop on the line wires: pin and brush a, condenser C2, inside right-hand contact of Et, secondary winding of the transformer T, right-hand outside work contact of Et, condenser C3, brush and pin b.

This tone acts on the relay Ac of the characteristic program line circuit in a manner already explained in order to stop the hunting of the finders of the marker discriminator if no other call is taking place.

It is clear that the code frequencies in relation with which the circuit described and shown in Figs. 3 and 4 has been provided is a code chosen by way of example, and that other codes might be used. For example, the following code might be used with advantage:

One frequency for each couple of digits 1–2, 3–4, 5–6, 7–8, 9–0,
One frequency for the odd (or even) digit of each couple,
One frequency for the second decade,
One frequency for the test;

that is, in all eight frequencies instead of twelve as in the code previously employed. Consequently, if telegraph generators with twelve frequencies are employed, four frequencies remain available. One of these four frequencies may be sent from the discriminator in order to insure the stoppage of the finders as described above.

In the case in which a code of this kind is employed a circuit of the marker discriminator must be modified and Fig. 5 shows a circuit modified in this way.

The marker discriminator shown in Fig. 5 differs from the previous one, particularly in the fact that the finder has five brushes instead of four, that the circuit is adapted to operate with the above-mentioned code, and that the release of the circuit is deferred if the calling subscriber is slow to hang up. It should be noted that the resistance and the battery of the wire e are actually in the line circuit, and are only indicated in Fig. 5 for the convenience of the drawing.

When a call arrives on a characteristic program line the relay A is energized as before, and the finder LF is energized and rotates: battery LF, cam C at 1 and 1, back contact of Dt, front contact of a, earth.

When the finder LF finds the calling line the relay Pt is energized because its anti-resonant circuit L1, C1 is placed in bridge on the line found, and applies to the grid of the valve V1 high alternate differences of potential. The anti-resonant circuit then is placed in the circuit: pin and brush a, condenser C2, cam F at 1 and 1, L1, cam G at 1 and 1, and condenser C1 and parallel, C3, brush and pin b.

Pt in being energized energizes Dt by the potential on the wire e, Dt, front contact of Pt, front contact of a, earth. Pt energizes Sh by the potential on the wire *e*, D*t*, S*h*, front contact of D*t*, front contact of *a*, earth.

The control switch R is actuated through battery, R, cam A, cam B at 1, work contact of S*h*, work contact of A, earth, and passes to position 2 through battery, R, earth on the cam A to position 2 of the control switch.

From position 1½ and as far as 3 the relay T*a* is energized through the battery T*a*, cam D at 1½+3 and 1½+18, earth. This relay connects to the line the secondary of a transformer, for example a transformer of which the primary is connected to the first frequency, or any one of the frequencies: pin and brush *a*, condenser C2, front contact of T*a*, secondary of the transformer T1, front contact of T*a*, condenser C3, brush and pin *b*. This frequency detected in the characteristic line circuit causes the stoppage of the finders. The earth given by the relay A will thenceforward be given by the cam D through 1½+18.

Shortly before the control switch arrives in position 2, if the step-by-step switch LS is not in the normal rest position, the relay P*n* is energized through: battery, relay P*n*, cam E at 1¾+2, and 1¾+2, *c* brush and pin, earth (Fig. 3). The relays I1 and I2 then begin to beat in the manner previously explained: the relay I1 is energized through battery, front contact of P*n*, I1, back contact I2, cam H at 2 and 2, interrupter INT*a*, earth and the relay I2 through battery, front contact of P*n*, I1, I2, front contact of I1, cam I at 2 and 2, interrupter INT*b*, earth. Upon each beat the line step-by-step switch LS advances because of the earth thus placed on the wire *d*: brush *d*, cam J at 2 and 2, front contact of I2, back contact of P*t*, earth on cam D. When this step-by-step switch reaches its normal position the earth on the wire *c* is eliminated and the relay P*n* falls back. The control switch R operates to reach position 11: Battery control switch R, cam A, cam B at 2, cam K at 2 and 2, back contact of P*n*, back contact of P*t*, cam D at 1½+18, and 1½+18, earth, and battery through R and the earth at A as far as position 11.

During this rotation from position 3 to position 6 a circuit tuned to the frequency characterizing a program group is bridged on the talking wires with a view to the group discrimination. On the one hand this circuit is connected to earth, and on the other to the grid of the triode detector valve V1, pin and brush *a*, condenser C2, cam F at 3+6 and 3+6, through self-inductance L1, cam G at 3+6 and 3+6 on the one hand, and the condenser C1 and cam G at 3+6 and 3+6 on the other hand in parallel, condenser C3, brush and pin *b*. The circuit is connected to the grid of the valve V1 through the cam F at 3+6.

If the frequency exists, and only in that case, the relay P*t* operates and permits the relay D*z* to be energized through: battery, relay D*z*, cam L at 3+11, and 3¼+5¾, front contact of P*t*, cam D at 1½+18 and 1½+18, earth. The relay D*z* locks through: battery, D*z*, cam L at 3+11 and 3¼+11, front contact of D*z*, contact of the bank *c* of the electro-magnet SS, earth.

From position 7 to position 10 of the control switch the discrimination of the line frequency takes place. In these positions a tuned circuit L1 and C1 and C5 in parallel tuned to a characteristic frequency is placed in shunt on the two line wires by the cams F and G. This circuit, on the one hand earthed through the cam G, and on the other hand connected to the grid of the triode V1 through the cam F, causes, if the same frequency is present on the line, and only in that case, the energization of P*t*, and consequently that of C*p*, through battery, relay C*p*, cam M at 7+12 and 7+10, work contact of P*t*, cam D at 1½+18 and 1½+18, earth. The relay C*p* is locked through battery, C*p*, cam M at 7+12¼ and 8+12¼ front contact of C*p*, earth.

In position 11, the control switch is stopped and for the setting of the marking step-by-step switch and of the line step-by-step switch the relay P*n* is energized through battery, relay P*n* is energized through battery, relay P*n*, cam N at 11 and 11, earth.

The relays I1, I2 are energized and beat as previously explained. Relay I1 is energized through the circuit: battery, front contact of P*n*, I1, back contact of 12, cam H at 11 and 11, interrupter INT*a*, earth. The relay I2 is fed through battery, front contact of P*n*, I1, I2, front contact of I1, cam I at 11 and 11, INT*b*, earth.

The line step-by-step switch and the marker step-by-step switch advance one step each for each beat of relays I1 and I2 through the following circuits: battery, line step-by-step LS, pin and brush *d*, cam J at 11 and 11, front contact of 12, back contact of P*t*, cam D at 1½+18 and 1½+18, earth, and battery, marker step-by-step switch SS, cam O at 11 and 11, front contact at 12, back contact of P*t*, cam D at 12+18 and 1½+18, earth.

The marker step-by-step switch SS, by its brush and its bank of pins, has modified a circuit tuned to one of the frequencies, each of which characterizes a group of two digits. Such a choice of frequencies say, for example, be as follows:

| Digits | Frequencies |
|---|---|
| 1–2 | 595 |
| 3–4 | 765 |
| 5–6 | 1105 |
| 7–8 | 1275 |
| 9–0 | 1615 |

Consequently, when the brush *a* is on the pins 1 or 2 these pins being connected to each other, a circuit tuned to the frequency 595 ps. will be bridged on the two line wires, through cams E and P: pin and brush *a*, condenser C2, cam E at 11 and 11, condenser C4 and earth on the one hand, brush and pin *a*1, *a*2, inductance L2, cam P at 11 and 11, condenser C3, brush and pin *b*. This circuit is on the one hand connected to earth and on the other to the grid of the triode V1 through the cam F. The relay P*t* operates if the frequency is present. Otherwise the step-by-step switch SS passes on to the pin 3 which is paired with the pin 4, connected to an inductance so that a circuit resonating at a frequency of 765 cycles per second is bridged on the two line wires. If this frequency is not present, the operation of the step-by-step switch continues in the same way.

When the anti-resonant circuit which corresponds to the frequency applied to the line is established, the relay P*t* is energized, the step-by-step switch is stopped and the control switch R leaves position 11, battery, control switch R, cam A, cam B at 11, cam Q at 11 and 11, front contact of P*t*, cam D at 1½+18 and 1½+18, earth; and battery, control switch R, earth, through A to position 14.

This operation only takes place if the relay D*z* is not energized. Nevertheless, when the relay D*z* has operated the step-by-step switch has to move 11, 13, 15, 17 or 19 steps instead of 1, 3, 5, 7 or 9 steps. In order to obtain this result the grid of the triode V1 is earthed during the 10 first steps through Dz, energized and locked on the normal pin and the 10 first positions of the bank c, cam K at 11 and 11, front contact of Dz, cam F at 11 and 11, grid.

The pins of the second half of the bank are connected to their corresponding terminals of the first half.

In order to obtain the correction requiring an additional step when a pair of digits has been chosen and the second digit was dialed, the relay Cp is actuated in the manner previously described if the signal frequency indicating the second digit of the selected pair is on the line. In this case when passing to position 12 the cam switches F, G connect across the line from brushes a, b a circuit (not shown) similar to L1, C1 but tuned to the frequency selected to indicate the second digit of a pair. If the latter frequency is on the line V1 is operated the step-by-step switches advance by one position. The line step-by-step switch LS advances through the circuit passing from the battery through the step-by-step switch LS, pin and brush d, cam J, at 12+12¼ and 12+12¼, front contact of Cp, front contact of Sh, cam D at 1½+18 and 1½+18 to earth. The step-by-step switch SS, cam O at 12 and 12¼ and 12+12¼, front contact of Cp, front contact of Sh, cam D at 1½+18 and 1½+18, earth.

Shortly before the stoppage of the control switch the relay Ph is energized through: battery, relay Pn, cam N at 14 and 14, mains and brush b of SS, earth. At 14 the relays I1 and I2 beat in the manner explained; the relay I1 through battery, front contact of Pn, I1, back contact of I2, cam H at 14 and 14, interrupter INTa, earth, and the relay I2 through the battery, front contact of Pn, I1, I2, front contact of I1, cam I at 14 and 14, interrupter INTb, earth. The step-by-step switch advances at each beat through battery, step-by-step switch cam O at 14 and 14, front contact of I2, back contact of Pt, cam D at 1½+18 and 1½+18, earth. Moreover, the high resistance relay Ir is placed in shunt on the line through the pin and the brush a, cam Q, at 14+16, and 14+16, Ir, brush and pin b, while on each operation of I1 a condenser of high capacity of C6 is placed in parallel to the relay. The object of this arrangement is as follows: the calling subscriber ceases to hear the characteristic tones of the program line every time that I1 has fallen back. Instead of a continuous complex sound he hears in his receiver a sound chopped at a quick rhythm and of quite a different character, indicating that the step-by-step switch of his line is in place on the azimuth corresponding to the desired program, and by this fact invites him to hang up his receiver.

When the step-by-step switch SS has resumed its normal rest position Pn falls back, stops the beat of the relay couple I1, I2, and causes the control switch R to pass to 16. The control switch R is actuated through the battery by R, cam A, cam B at 14, cam K at 14+14, back contact of Pn, back contact of Pt, cam D at 1½+18 and 1½+18, earth, and continues through the following circuit: battery, R, earth through A to position 16.

From position 15 the relay Pn is energized through battery, relay Pn, cam N at 15+16, and 15+16, earth. The relay I1 beats only in position 16 through the battery, front contact of Pn, relay I1, back contact of 12, cam H at 16 and 16, interrupter INTa, earth.

If when hearing the chopped sound which warns him that the step-by-step switch has taken the program line, the subscriber hangs up immediately, Ir falls back again, the control switch leaves position 16 and returns to the normal rest position: battery, R, cam A, cam B at 16, rest contact of Ir, cam N at 16, and 15+16, earth, and battery, R, earth through A to 1.

If the subscriber delays hanging up, the time contact maker Ta supplied at 16 through the battery, TA, cam C at 16 and 16, earth, establishes its contact T at the end of a predetermined time according to the requirements of the service, and the discriminating circuit is released through the circuit: battery, R, cam A, cam B at 16, contact T, earth, and battery R, earth through A to 1. The calling subscriber again hears the complex tone which reaches him from the characteristic line.

It should be noted that the grid of the triode V1 is connected to earth through cam D at 1½ 2½, 6½, 10½ and 11½+18, in all the positions of the control switch in which the frequency determination does not take place, thus any unintentional operation of the relay Pt is avoided.

It is clear that the invention is not limited to the examples described, but on the contrary may find other methods of application particularly for its adaptation to different choices of frequencies.

What is claimed is:

1. A combined automatic telephone and broadcast system comprising a subscriber's station, a program selecting and transmitting system including a plurality of program sources, means for connecting said system to the station, and means selectively responsive to different frequencies for actuating the program system to select a program, including a series of circuits each tuned to a different frequency, means for applying to said circuits in succession a signal wave of predetermined frequency received from a subscriber's station, means for engaging said program sources in succession, and means operative when one of said circuits resonates in response to the latter frequency for arresting the program source engaging means.

2. A combined system as set forth in claim 1, comprising means responsive to a second frequency received from a subscriber's station for further advancing the program selecting means.

3. A combined system as set forth in claim 1, in which each of said circuits is associated with two program sources, the latter means being effective to arrest the program source engaging means in engagement with the first of said two program sources, said combined system including means responsive to a signal wave having a second frequency received from the subscriber's station for advancing the program source engaging means into engagement with the second of said two program sources.

4. A combined system as set forth in claim 1, in which said series of circuits includes two successive groups each tuned to the same series of frequencies, the combined system including means responsive to signal waves having another frequency received from the subscriber's station to prevent operation of the arresting means when the former signal wave is applied to circuits of the first group.

5. A combined automatic telephone and broadcast system, comprising a subscriber's station, a program selecting and transmitting system including a program selecting switch system connected to said station and a plurality of program sources successively engaged by said switch system, a selective switch system including a switch having a series of contacts, a series of tuned circuits connected to said contacts, each circuit being tuned to a different signal frequency received from the subscriber's station, the operating means including means for applying such signal frequency to said circuits in sequences through the switch, a switch arresting circuit connected to said switch, and means for energizing the latter circuit when the switch engages the tuned circuit that is tuned to said signal.

6. A combined automatic telephone and broadcast system, comprising a subscriber's station, a program selecting and transmitting unit including a starting circuit, said starting circuit including an arresting circuit tuned to a predetermined frequency, an automatic discriminator and a program selecting switch unit, said system comprising switch means for connecting said station and starting circuit, means in the starting circuit operative when the latter connection is made to actuate the discriminator to place it in condition for operation from the subscriber's station, means effective when the discriminator is in said condition for rendering said actuating means ineffective and means included in said last named means being operative to send a signal of said predetermined frequency from said discriminator to said starting circuit.

7. A combined system as set forth in claim 6, including means for transmitting a characteristic audible signal from the starting circuit to the calling station when the calling station is initially connected to the subscriber's station.

8. A combined system as set forth in claim 6, including means for transmitting a characteristic audible signal from the starting circuit to the calling station when the calling station is initially connected to the subscriber's station, and a different signal when the discriminator is thereafter connected to the program selecting means.

CLEMENT MARIE THEILLAUMAS.

REFERENCES CITED

The following references are of record in the file of this patent:

UNITED STATES PATENTS

| Number | Name | Date |
|---|---|---|
| 1,458,225 | Espenschied | June 12, 1923 |
| 1,522,580 | Espenschied | Jan. 13, 1925 |
| 1,629,491 | Fetter | May 24, 1927 |
| 1,632,012 | Toomey | June 14, 1927 |
| 1,672,568 | Hoge | June 5, 1928 |
| 1,684,361 | Powell | Sept. 11, 1928 |
| 1,754,876 | Clement | Apr. 15, 1930 |
| 1,754,878 | Clement | Apr. 15, 1930 |
| 2,095,360 | Green | Oct. 12, 1937 |
| 2,202,474 | Vroom | May 28, 1940 |
| 2,317,191 | Holbrook | Apr. 20, 1943 |
| 2,430,471 | Lang | Nov. 11, 1947 |